United States Patent
Yoo et al.

(10) Patent No.: US 11,144,821 B2
(45) Date of Patent: Oct. 12, 2021

(54) IMPLEMENTING A NEUROMORPHIC COMPUTING SYSTEM USING NANOPHOTONIC NEURONS

(71) Applicant: The Regents of the University of California, Oakland, CA (US)

(72) Inventors: Sung-Joo Ben Yoo, Davis, CA (US); David A. B. Miller, Stanford, CA (US)

(73) Assignee: The Regents of the University of California, Oakland, CA (US)

(*) Notice: Subject to any disclaimer, the term of this patent is extended or adjusted under 35 U.S.C. 154(b) by 592 days.

(21) Appl. No.: 16/115,353

(22) Filed: Aug. 28, 2018

(65) Prior Publication Data
US 2019/0065941 A1   Feb. 28, 2019

Related U.S. Application Data

(60) Provisional application No. 62/552,291, filed on Aug. 30, 2017.

(51) Int. Cl.
G06N 3/067 (2006.01)
G06N 3/063 (2006.01)
G06N 3/04 (2006.01)
G06N 3/08 (2006.01)

(52) U.S. Cl.
CPC ............. *G06N 3/063* (2013.01); *G06N 3/049* (2013.01); *G06N 3/0481* (2013.01); *G06N 3/0675* (2013.01); *G06N 3/08* (2013.01)

(58) Field of Classification Search
CPC ...... G06N 3/063; G06N 3/0481; G06N 3/049; G06N 3/0675; G06N 3/08; G06N 3/04; G06N 3/067
See application file for complete search history.

(56) References Cited

U.S. PATENT DOCUMENTS

2008/0258767 A1* 10/2008 Snider .................... G06N 3/063
    326/46
2018/0211158 A1* 7/2018 Shainline ............. G06N 3/0472

OTHER PUBLICATIONS

Kang et al. "Signal-to-noise ratio gain of a noisy neuron that transmits subthreshold periodic spike trains", Physics Review, 2005, pp. 7.*
Ehsan et al. "Hybrid Three-Dimensional Integrated Circuits: A Viable Solution for High Efficiency Neuromorphic Computing", VLSI-DAT, Apr. 2017, pp. 2.*

* cited by examiner

*Primary Examiner* — Li Wu Chang
(74) *Attorney, Agent, or Firm* — Park, Vaughan, Fleming & Dowler LLP

(57) ABSTRACT

The disclosed embodiments relate to a system that implements a photonic neuron. This photonic neuron includes: an excitatory-input photo detector that converts an optical excitatory input signal into a corresponding electrical excitatory input signal; and an inhibitory-input photo detector that converts an optical inhibitory input signal into a corresponding electrical inhibitory input signal. It also includes an electrical neuron that receives the electrical excitatory and inhibitory input signals, and generates an electrical output signal, which includes periodic voltage spikes that are triggered by integration of the electrical excitatory and inhibitory input signals. Finally, the photonic neuron includes a light-emitting output device, which converts the electrical output signal into a corresponding optical output signal.

17 Claims, 9 Drawing Sheets

IMPLEMENTING A NEUROMORPHIC COMPUTING SYSTEM USING NANOPHOTONIC NEURONS

CROSS-REFERENCE TO RELATED APPLICATION

This application claims priority under 35 U.S.C. § 119(e) to U.S. Provisional Application Ser. No. 62/552,291, entitled "Nanophotonic Computing," by inventor Sung-Joo Ben Yoo, filed on 30 Aug. 2017, the contents of which are hereby incorporated by reference.

BACKGROUND

Field

The disclosed embodiments generally relate to nanophotonic computing systems. More specifically, the disclosed embodiments relate to a design for a neuromorphic computing system, which is implemented using nanophotonic neural circuits.

Related Art

As computer systems become increasingly faster, communication delays are beginning to significantly constrain computational performance. Most modern computer systems are based on a "von Neumann architecture," wherein data is retrieved from memory and is processed at a central processing unit (CPU). Unfortunately, as computer systems become faster, the limited data throughput that is available between CPU and memory (and between levels of cache within the CPU) is beginning to significantly limit computational performance and associated energy efficiency. (This throughput-related performance limitation between CPU and memory is referred to as the "von Neumann bottleneck.")

To overcome the performance problems associated with the von Neumann bottleneck, a significant amount of research has been recently directed toward "neuromorphic circuits," which attempt to mimic the behavior of neurons in the human brain. Neuromorphic circuits comprise a collection of circuit elements that model individual neurons, wherein each circuit element receives input current pulses from upstream neurons and generates output current pulses that are directed to downstream neurons. The large number of interconnections among individual neurons in a neuromorphic circuit makes it possible to overcome the von Neumann bottleneck for certain types of computations, such as pattern-recognition operations.

Recently developed neuromorphic hardware systems, such as IBM's TrueNorth™ chip, which is based on a low-leakage 28 nm CMOS technology, have achieved 176,000 times higher energy efficiency than state-of-the-art von Neumann computing systems. However, the TrueNorth™ system and other related systems have the following shortcomings: (1) the hardware can only do what it is trained to do, and the training processes is time/energy consuming; (2) electronic implementations include long electrical wires with large capacitances and associated high interconnect energy consumption; (3) the TrueNorth™ chip runs at slow speeds, consuming 2.3 pJ/bit with an additional 3 pJ/bit for every centimeter of transmission; (4) electronic interconnect topologies typically radiate in four directions, and consequently require a number of repeaters; and (5) these systems provide limited scalability owing to a two-dimensional (2D) interconnection topology within a single hierarchy.

Hence, what is needed is a new design for a neuromorphic circuit, which does not suffer from the above-listed shortcomings of existing neuromorphic circuits.

SUMMARY

The disclosed embodiments relate to a system that implements a photonic neuron. This photonic neuron includes: an excitatory-input photo detector that converts an optical excitatory input signal into a corresponding electrical excitatory input signal; and an inhibitory-input photo detector that converts an optical inhibitory input signal into a corresponding electrical inhibitory input signal. It also includes an electrical neuron that receives the electrical excitatory and inhibitory input signals, and generates an electrical output signal, which includes periodic voltage spikes that are triggered by integration of the electrical excitatory and inhibitory input signals. Finally, the photonic neuron includes a light-emitting output device, which converts the electrical output signal into a corresponding optical output signal.

In some embodiments, the electrical neuron implements an integrate-and-fire model, wherein the electrical excitatory and inhibitory input signals are integrated until a firing threshold is reached, which causes the electrical neuron to fire and generate a voltage spike on the electrical output signal.

In some embodiments, the electrical neuron implements a sigmoid-shaped nonlinear activation function.

In some embodiments, the light-emitting output device comprises a light-emitting diode (LED), the excitatory-input photo detector comprises a first photodiode, and the excitatory-output photo detector comprises a second photodiode.

In some embodiments, the photonic neuron comprises the following elements: the first photodiode coupled between an internal node and $v_d$; the second photodiode coupled between ground and the internal node; an integrating capacitor coupled between the internal node and ground; a first transistor, having a gate coupled to the internal node; the light-emitting diode coupled between a drain of the first transistor and $v_d$; a second transistor, having a gate coupled to a source of the first transistor and having a source coupled to ground; a first resistor coupled between the internal node and a drain of the first transistor; and a second resistor coupled between the gate of the second transistor and ground.

In some embodiments, the electrical excitatory input signal comprises a weighted sum of one or more excitatory input signals, and the electrical inhibitory input signal comprises a weighted sum of one or more inhibitory input signals.

The disclosed embodiments also relate to a system that implements a neuromorphic computing system. This system includes a sequence of neural layers, wherein each neural layer comprises a set of photonic neurons, and wherein each photonic neuron converts one or more optical input signals into corresponding electrical input signals, processes the electrical input signal to produce an electrical output signal, and converts the electrical output signal into an optical output signal. The system also includes a set of intervening optical interconnection networks, which couple together successive neural layers in the sequence of neural layers, wherein each interconnection network provides weighted links between photonic neurons in successive neural layers.

In some embodiments, each optical interconnection network in the set of intervening optical interconnection networks comprises a network of 2×2 Mach-Zehnder interferometer blocks connected in a mesh.

The disclosed embodiments also relate to a system that implements a three-dimensional (3D) integrated neuromorphic computing system. This 3D integrated neuromorphic computing system comprises a stack containing computational planes, wherein each computational plane in the stack includes a nanophotonic neural network. The stack additionally includes at least one memory plane containing nanophotonic memory elements. Successive planes in the stack are coupled together through a set of vertical optical vias.

In some embodiments, each vertical optical via in the set of vertical optical vias comprises: a bottom waveguide configured to convey light in a horizontal direction; an inverted 45-degree reflector configured to reflect horizontally propagating light from the bottom waveguide in a vertical direction; a vertical silicon escalator configured to convey light in a vertical direction from the inverted 45-degree reflector; a 45-degree reflector configured to reflect vertically propagating light from the vertical silicon escalator in a horizontal direction; and a top waveguide configured to convey light received from the 45-degree reflector in a horizontal direction.

DETAILED DESCRIPTION

Figure 1A:
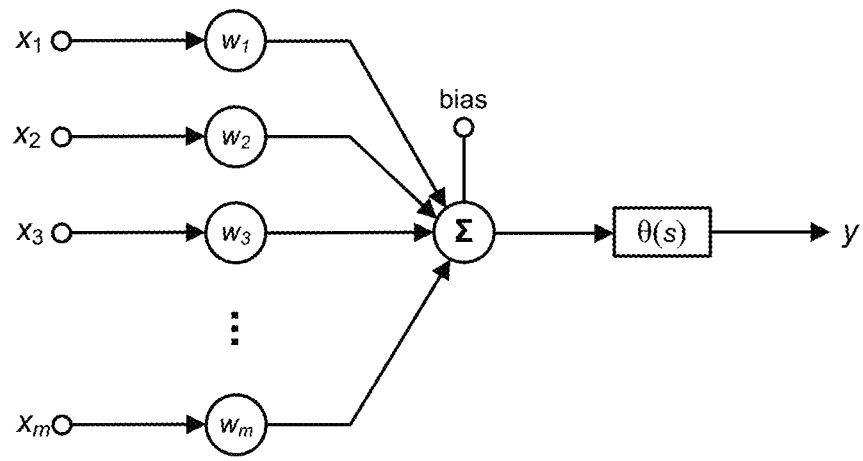
FIG. 1A illustrates a model of a nonlinear neuron, which includes synapses, weighted addition and a nonlinear activation function, in accordance with disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

DISCUSSION

The disclosed embodiments provide a system that includes energy-efficient bio-inspired nanophotonic neurons together with synapses and neural networks to interconnect them. Biological neurons are known to emit electrical pulses, or a series of stereotyped action potentials, or spikes, after receiving stimuli. Coding of information in the form of the timing of the spikes (temporal coding) and the spike rate (rate coding) has been a subject of active research. In designing nanophotonic spiking neural networks, three fundamental elements, namely the neuron, the synapses, and the coding scheme, should preferably be designed together to have: (1) weighted addition—the ability to sum weighted inputs; (2) integration—the ability to integrate the weighted sum over time; (3) thresholding—the ability to make a decision whether or not to send a spike (all-or-none); (4) reset—the ability to have a refractory period during which no firing can occur immediately after a spike is released; and (5) pulse generation—the ability to generate new pulses.

Figure 1B:
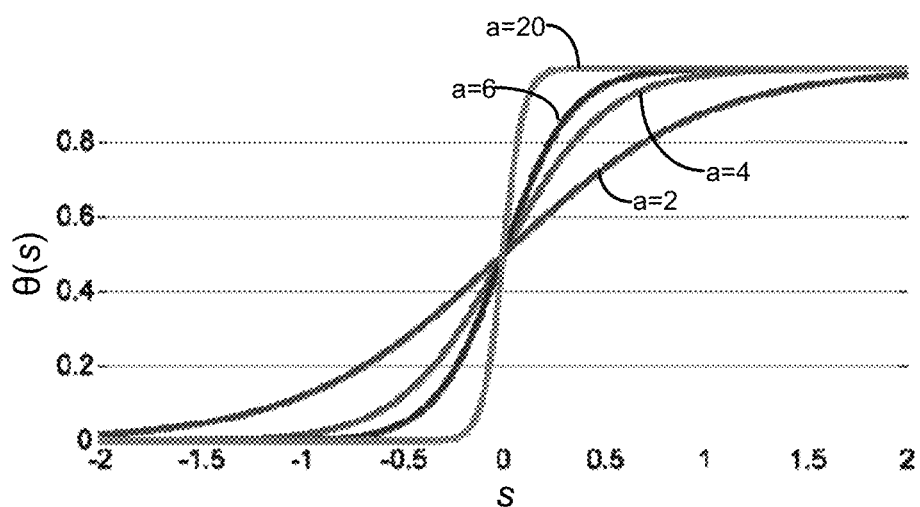
FIG. 1B presents a graph illustrating nonlinear activation functions with five different slope parameters in accordance with disclosed embodiments.

FIG. 1A illustrates a simple exemplary neuron, where the input into the neuron is a linear combination (weighted addition) of the output of other neurons. This neuron integrates the weighted signals over time and produces a nonlinear response, which is represented by an activation function. FIG. 1B illustrates this type of nonlinear activation function (e.g., sigmoid function) for five different slope parameters a. The neuron's output is then broadcast to successive nodes in the network. Note that the inter-neuron connections can be weighted with positive and negative values represented as excitatory and inhibitory synapses, respectively. The synaptic interconnection network of neurons can be represented as a matrix of the weight values ($w_{ij}$) or real numbers. Moreover, the coding scheme will map the real-valued weights and represent them as spiking signals.

Figure 2A:
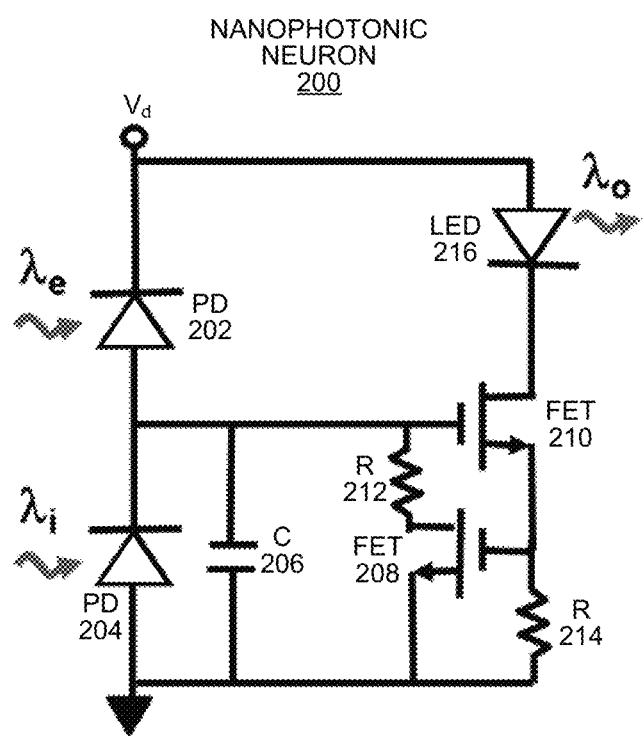
FIG. 2A presents a circuit diagram of a nanophotonic neuron in accordance with disclosed embodiments.

FIG. 2A illustrates an exemplary implementation for a nanophotonic neuron 200 with a spiking electronic circuit. As illustrated in FIG. 2A, nanophotonic neuron 200 includes: nanophotonic detectors (PD 202 for excitatory and PD 204 for inhibitory), and a nanophotonic LED 216. Other circuit elements, such as resistors 212 and 214 and capacitance C 206 (which is inclusive of the capacitances of PDs 202 and 204 and FETs 208 and 210), can be tuned to achieve a desired sigmoid response function, including temporal and rate coding.

In the nanophotonic neurons shown in FIG. 2A, the spiking electronic circuit is placed in between the nanophotonic detectors (PD 202 and PD 204) and the nanophotonic LED 216 with extremely low capacitance values C 206 to achieve ~10 fJ/b energy efficiency with fan out. The exemplary nanophotonic neuron follows a leaky integrate-and-fire (LIF) neuron model, which exploits high quantum-efficiency PDs and LEDs with low capacitance in the ~1 fF range. Of the two nanophotonic detectors PD 202 and PD 204, PD 202 is for the excitatory signal, PD 204 is for the inhibitory signal. The output of these two PDs 202 and 204 controls the gate voltage of field-effect transistor (FET) 210, which turns on/off the LED 216 based on the strength of two input signals received through PD 202 and PD 204. The second FET 208, which is coupled with resistor 212 and capacitor C 206, serves as the feedback unit for the spiking current generation. When the input signal turns on FET 210, a spiking optical signal is generated by LED 216. When the FET 210 is turned on, it also causes FET 208 to turn on, which leads to capacitor 206 being discharged, hence then turning off the FET 210 and completing the spiking action. Note that by replacing the input/output interfaces with nanophotonic PDs and LEDs, the neuron power consumption can be drastically reduced due to the absence of capacitive charge associated with the interconnect wires. Moreover, the design of the nanophotonic and FET structures, the static power consumption is extremely low. This leads to an expected static power consumption of ~2 nW for a ~2V supply and a reserve leakage current of ~1 nA.

Figure 2B:
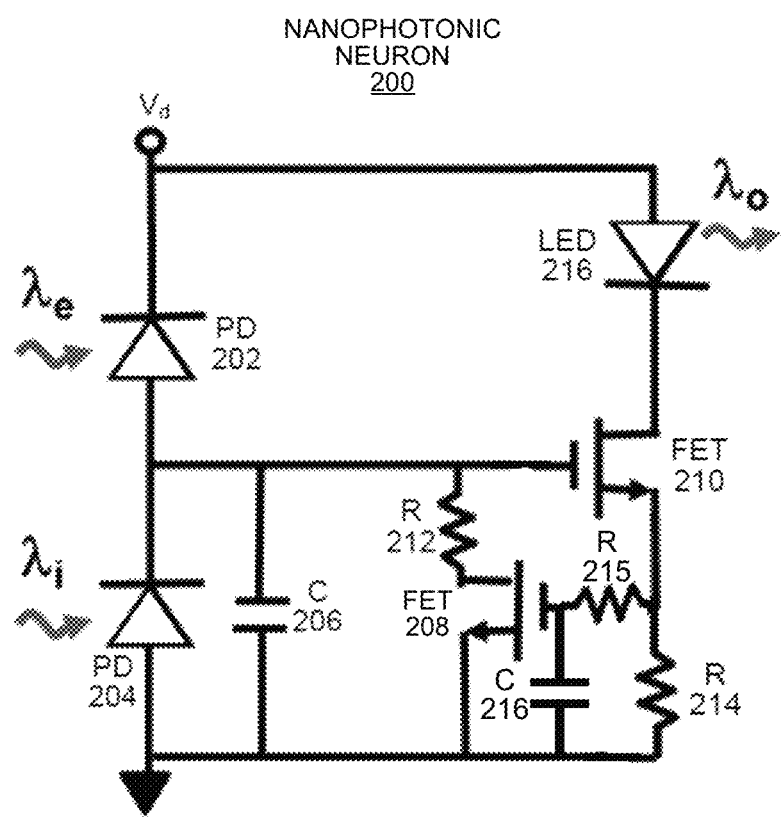
FIG. 2B presents an alternative circuit diagram of a nanophotonic neuron in accordance with the disclosed embodiments

FIG. 2B illustrates an exemplary implementation for a nanophotonic neuron in which an additional resistor 215 and an additional capacitor 216 are added to the circuit of FIG. 2A. The additional resistor 215 and capacitor 216 are provided for additional control of the length in time of the spiking action in the optical signal generated by LED 216. Specifically, once FET 210 starts to turn off because of the discharge of capacitor 206, the voltage on capacitor 206 is temporarily retained at a high value, causing FET 208 to remain on for some extended time, thereby completing the action of discharging capacitor 206 if necessary to complete the spiking action.

Figure 2C:
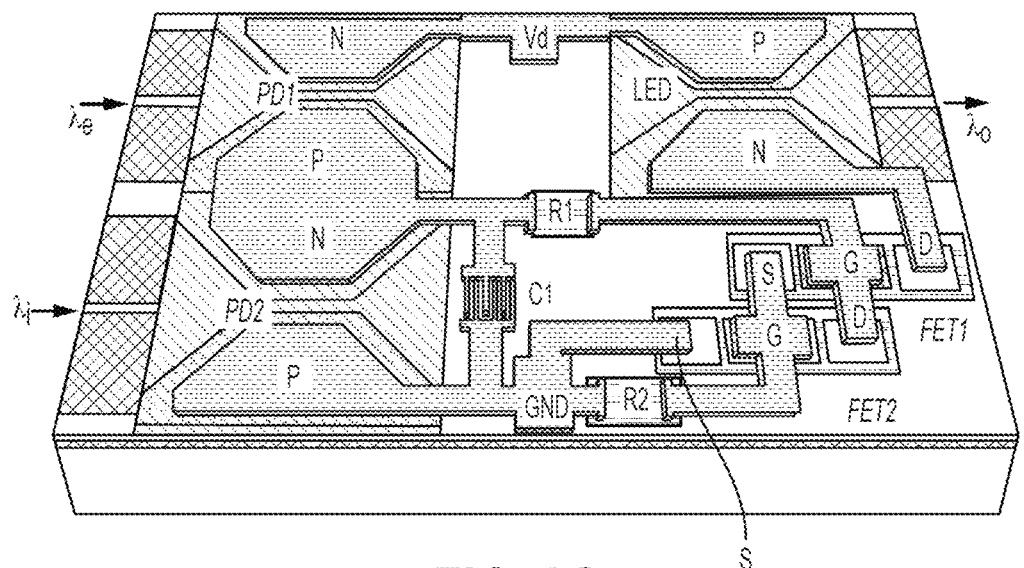
FIG. 2C presents a proposed semiconductor layout for the nanophotonic neuron illustrated in FIG. 2A in accordance with disclosed embodiments.

FIG. 2C illustrates a structural semiconductor layout for the optoelectronic neuron circuit illustrated in FIG. 2A. This semiconductor layout includes two InGaAs photonic crystal enhanced photodiodes (PDs) for excitatory and inhibitory inputs, and two FETs on SOI for thresholding and spiking signal generation. A photonic crystal cavity LED for in-plane emission is also incorporated serving as an axon function. It is advantageous to use a low-Q photonic crystal PD based on a heterogeneously integrated hybrid InGaAs/Si cavity. A lateral p-i-n InGaAs layer can be integrated on top of the patterned Si photonic crystal defect cavities to form a hybrid resonant cavity. Note that an ultra-low capacitance PD can generate a sufficiently large voltage without an amplifier when combined with a high impedance load. Based on this configuration, ~1.7 fF of capacitance is expected in a 1.7 μm InGaAs nanophotonic PD.

Figure 2D:
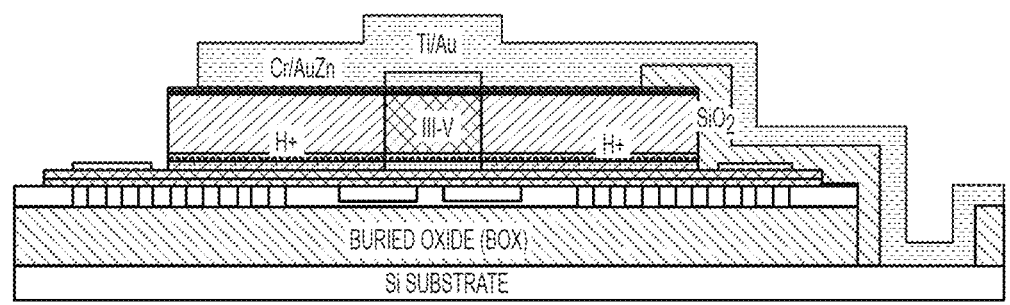
FIG. 2D presents a cross-sectional view of the semiconductor layout illustrated in FIG. 2C in accordance with disclosed embodiments.

As illustrated by the corresponding cross-sectional diagram in FIG. 2D, the nanophotonic photodetectors and LED can be fabricated on silicon using heterogeneous integration through wafer bonding to realize hybrid III-V/silicon nanophotonic devices. The photonic crystal structures, as well as the FET devices, can be fabricated on silicon-on-insulators, while wafer-bonding of III-V materials will allow realization of the nanophotonic LED and the nanophotonic detectors.

In addition to an ultra-compact size and an extremely low capacitance, the extremely short electrical contacts between PDs and next-stage FET transistors can further guarantee extremely low circuit power consumption. Such a so-called "receiver-less" system, as proposed by David Miller, can rely on a full logic voltage swing from the PD itself. (See D. A. B. Miller, "Attojoule Optoelectronics for Low-Energy Information Processing and Communications—a Tutorial Review," *Journal of Lightwave Technology*, 2017.) It is anticipated that such a system can operate beyond 10 GHz bandwidth with ultralow energy consumption of ~1 fJ/bit. It is possible to fabricate all of the devices on a silicon platform in which the FET and waveguides will be on silicon-oxide waveguides, while LEDs and PDs will utilize hybrid III-V (InGaAs, InGaAsP, InP, AlInGaAs) on a silicon/SiO2 structure with photonic crystal patterns etched on silicon.

Nanophotonic Neural Network

Figure 3:
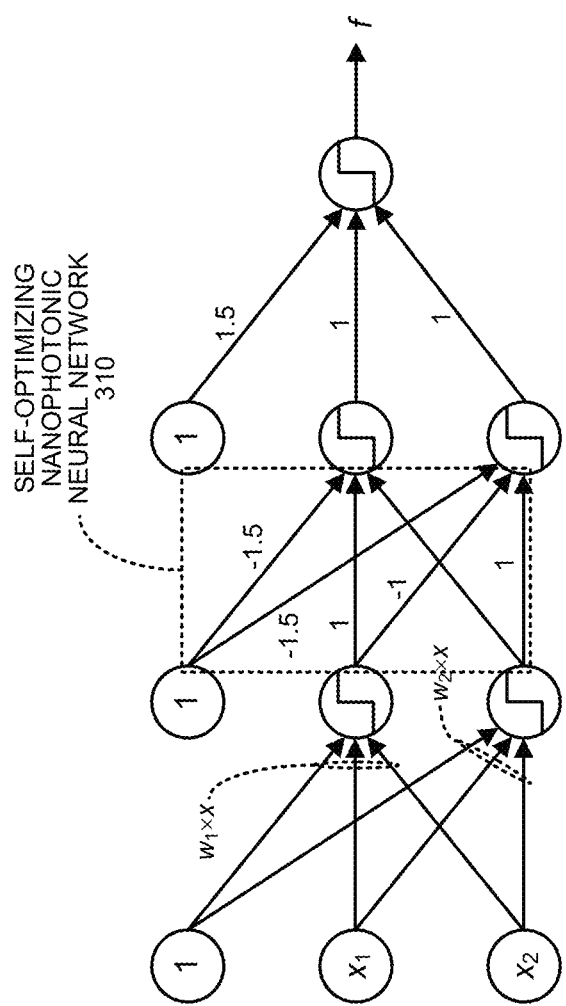
FIG. 3 illustrates a nanophotonic neural network comprised of nanophotonic neurons in accordance with the disclosed embodiments.

FIG. 3 illustrates an exemplary nanophotonic neural network with nanophotonic neurons at each node, and a self-optimizing nanophotonic neural network 310 comprised of 2×2 NEMS-MZI interferometer blocks between each layer. The output of nanophotonic neurons (e.g., $x_i^{(l-1)}$ at layer (l-1)) is related to the output of nanophotonic neurons at the next layer ($x_i^{(l)}$ at layer l) via the relationship: $x_j^{(l)} = \theta(s_j^{(l)}) = \theta(\Sigma_{i=0}^{d^{(l-1)}} w_{ij}^{(l)} x_i^{(l-1)})$, where $w_{ij}^{(l)}$ is the weight, and θ is the sigmoid transfer function.

Figure 4:
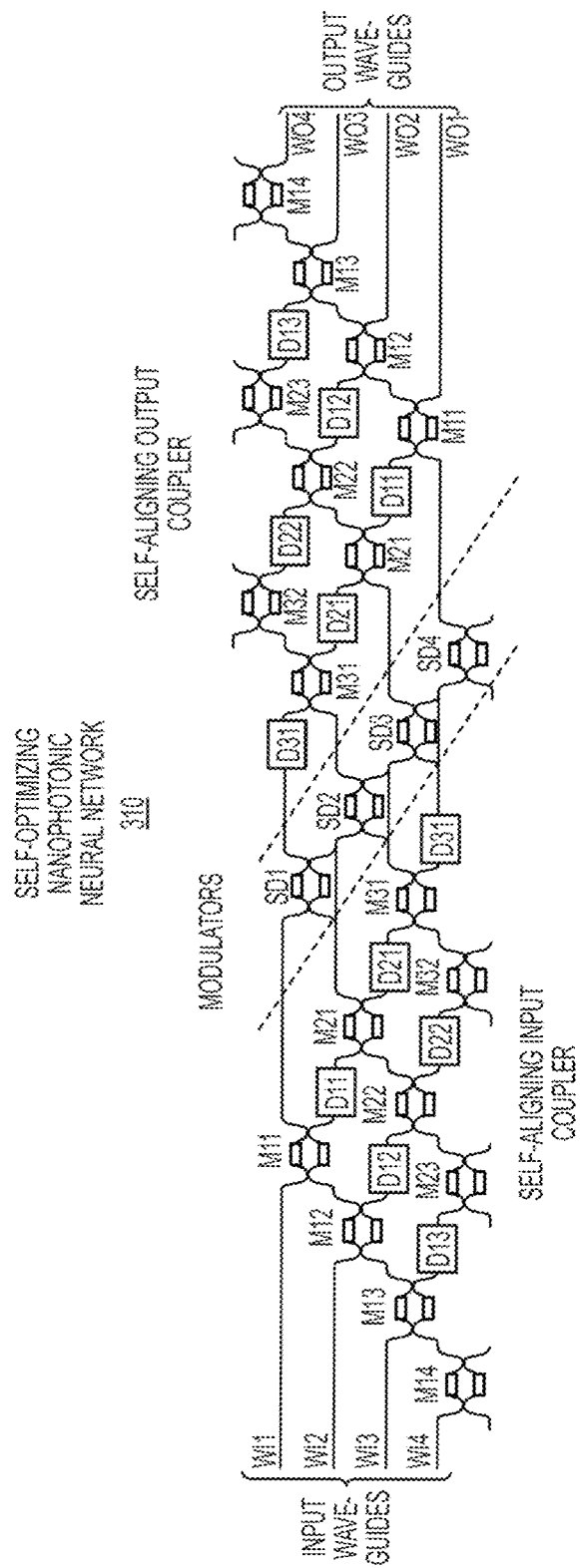
FIG. 4 illustrates a self-optimizing nanophotonic neural network in accordance with disclosed embodiments.

An important part of a neural computation scheme is a technique for providing this set of weighted connections from the neuron outputs (here, for example, Purcell-enhanced LEDs) and the inputs to the next layer of neurons (for example, photodetectors or phototransistors). Recently, the inventors proposed a new system to implement any set of weighted connections from a set of optical outputs to a set of optical inputs. Referring to FIG. 4, this new system can be based on a "universal linear optical component" that can be built using a network of 2×2 Mach-Zehnder interferometer blocks (for example, the elements M11, M12 in FIG. 4) connected in a mesh. The network 310 illustrated in FIG. 4 is able to implement any linear transform from its inputs, which are the outputs of the neurons, to its outputs, which are the inputs to the next layer of neurons. (See D. A. B. Miller, "Self-configuring universal linear optical component," *Photonics Research*, vol. 1, pp. 1-15, 2013.)

Unlike many previous optical schemes, this can be accomplished without having to throw away any of the optical power unless necessary for the desired linear mapping. Furthermore, this network can be set up without calculations and without calibration of the components, based on training it with appropriate sets of input light beams, and based on a sequence of local feedback loops using mostly transparent local detectors, such as the elements D11, D12, etc. This ability to train the network can also be used to stabilize it, meaning that what otherwise would be a complex linear interferometric network that is very difficult to calibrate and set up can instead be a self-configuring and self-stabilizing system.

This approach makes it possible to set up arbitrary network connections between layers of neurons. Importantly, such an optical approach with weights set by the interferometer settings can perform all the necessary multiplications of the neuron outputs by those weights and their subsequent summation for the inputs of the next neurons with no power dissipation.

There exists a broad set of simple techniques for configuring such networks, which have now been successfully demonstrated experimentally in such meshes. (For example, see D. A. B. Miller, "Self-aligning universal beam coupler," *Optics Express*, vol. 21, pp. 6360-6370, 2013.)

Figure 5:
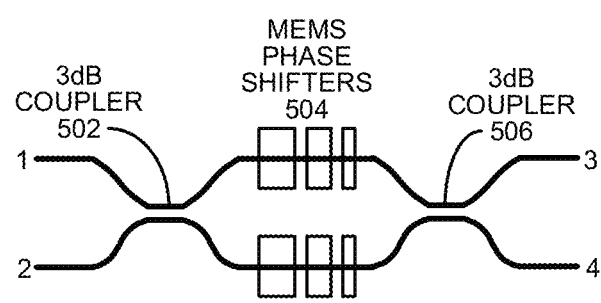
FIG. 5 illustrates a Mach-Zehnder element containing phase shifters of different lengths in accordance with disclosed embodiments.

The bio-inspired synaptic interconnection fabric illustrated in FIG. 4 can utilize 2×2 Mach-Zehnder interferometers with integrated nano-MEMS (NEMS-MZI) on each arm supporting non-volatile, arbitrary and independent control of phase and amplitude as shown in FIG. 5. FIG. 5 illustrates a Mach-Zehnder layout containing phase shifters of different lengths. They can be operated either as continuous phase shifters (with analog phase control) or as latching binary phase shifters, in which N phase shifts are arranged to enable a phase shift up to $2\pi$ radians with N-bit accuracy. FIG. 5 illustrates an exemplary 3-bit system.

Operating the phase shifter in common mode allows the device to operate as a phase modulator. On the other hand, if the phase shifters are operated in differential mode, the structure is an amplitude modulator. Two types of micromechanical phase shifters can be used, both of which are actuated electrostatically. The first is designed for analog control of the phase shifts, while the second includes a bi-stable mechanical latch that allows it to be actuated into one of two stable states that do not require a holding voltage. The binary phase shifters can be arranged in a sequence of $\pi, \pi/2, \ldots, \pi/2^{N-1}$ phase shifts for N-bit control of the phase in each arm for amplitude and phase control of the splitting ratios.

Three-Dimensional Implementation

Figure 6:
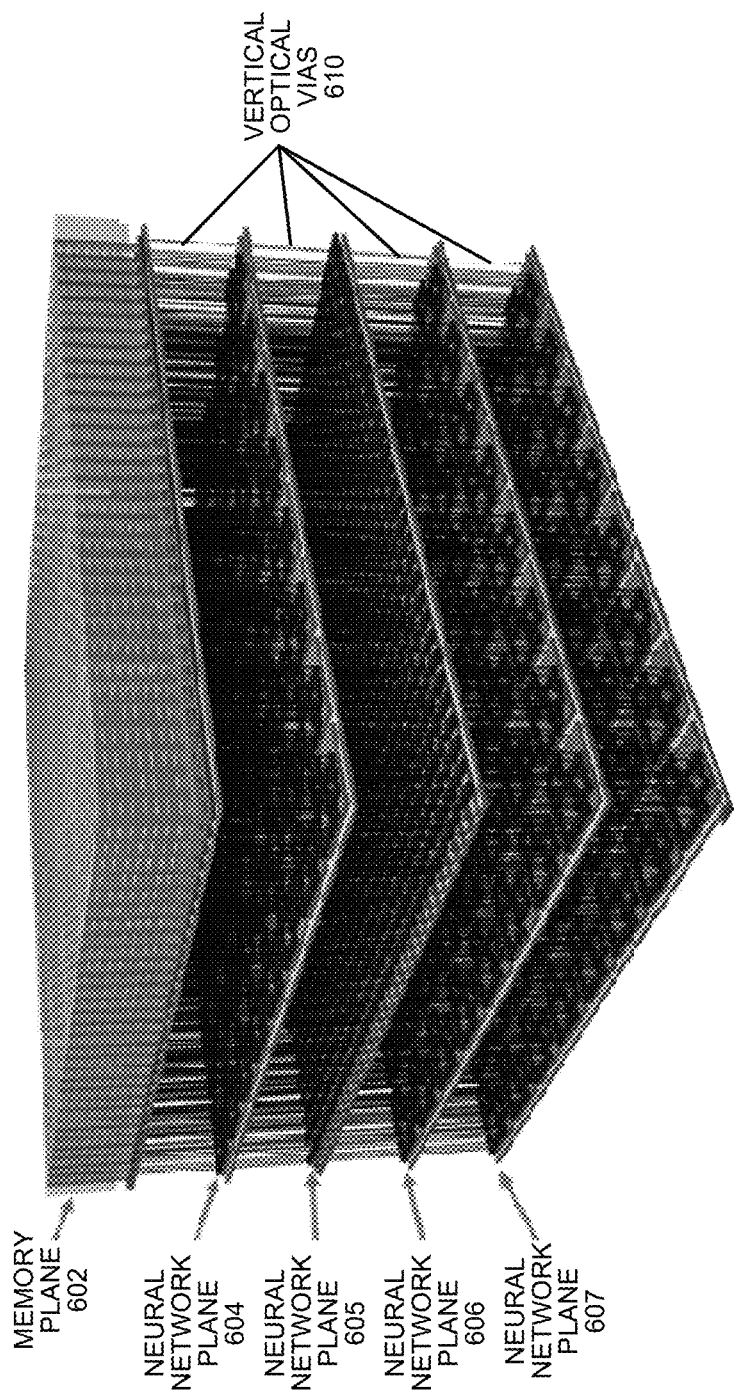
FIG. 6 illustrates a system that implements a three-dimensional (3D) integrated neuromorphic computing system in accordance with the disclosed embodiments.

FIG. 6 illustrates a system that implements a three-dimensional (3D) integrated neuromorphic computing system in accordance with the disclosed embodiments. This 3D integrated neuromorphic computing system comprises a stack containing neural network planes 604-607, wherein each neural network plane in the stack includes a nanophotonic neural network, such as the nanophotonic neural network illustrated in FIG. 3. The stack additionally includes a memory plane 602 containing nanophotonic memory elements. Note that successive planes in the stack are coupled together through a set of vertical optical vias 610.

Figure 7:
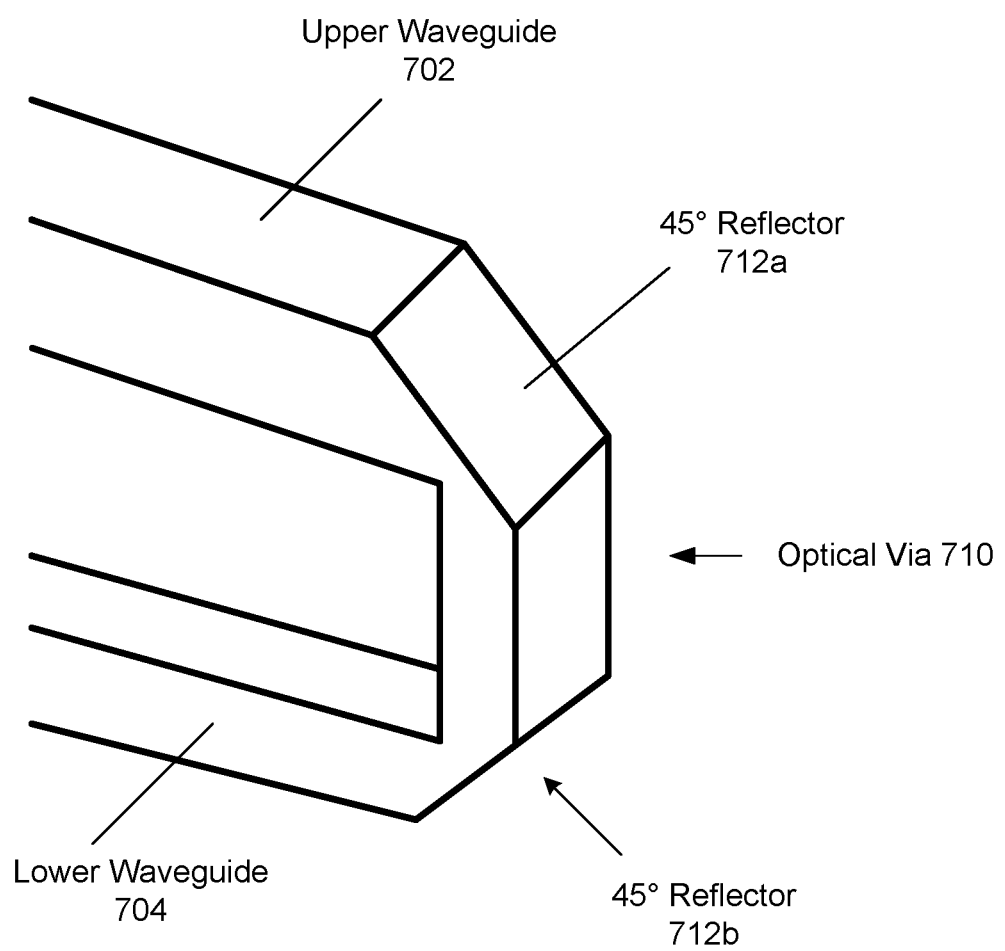
FIG. 7 illustrates a vertical optical via in accordance with the disclosed embodiments.

FIG. 7 illustrates a vertical optical via in accordance with the disclosed embodiments. In these embodiments, optical via 710 includes two 45° reflectors 712a, 712b that connect upper (or top) waveguide 702 and lower (or bottom) waveguide 704.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A photonic neuron, comprising:
   an excitatory-input photo detector comprising a first photodiode that converts an optical excitatory input signal into a corresponding electrical excitatory input signal;
   an inhibitory-input photo detector that converts an optical inhibitory input signal into a corresponding electrical inhibitory input signal;
   an electrical neuron that receives the electrical excitatory and inhibitory input signals, and generates an electrical output signal, which includes periodic voltage spikes that are triggered by integration of the electrical excitatory and inhibitory input signals;
   a light-emitting output device comprising a second photodiode, which converts the electrical output signal into a corresponding optical output signal;
   an integrating capacitor coupled between an internal node and ground;
   a first transistor having a gate coupled to the internal node;
   a second transistor having a gate coupled to a source of the first transistor and having a source coupled to ground;
   a first resistor coupled between the internal node and a drain of the first transistor; and
   a second resistor coupled between the gate of the second transistor and ground;
   wherein the light-emitting output device comprises a light-emitting diode (LED) or a laser.

2. The photonic neuron of claim 1, wherein the electrical neuron implements an integrate-and-fire model, wherein the electrical excitatory and inhibitory input signals are integrated until a firing threshold is reached, which causes the electrical neuron to fire and generate a voltage spike on the electrical output signal.

3. The photonic neuron of claim 2, wherein the electrical neuron implements a sigmoid-shaped nonlinear activation function.

4. The photonic neuron of claim 1,
   wherein the electrical excitatory input signal comprises a weighted sum of one or more excitatory input signals; and
   wherein the electrical inhibitory input signal comprises a weighted sum of one or more inhibitory input signals.

5. A neuromorphic computing system, comprising:
   a sequence of neural layers, wherein each neural layer comprises a set of photonic neurons, wherein each photonic neuron converts one or more optical input signals into corresponding electrical input signals, processes the electrical input signal to produce an electrical output signal, and converts the electrical output signal into an optical output signal; and
   a set of intervening optical interconnection networks, which couple together successive neural layers in the sequence of neural layers, wherein each interconnection network provides weighted links between photonic neurons in successive neural layers;
   wherein each photonic neuron comprises:
      a first photodiode coupled between an internal node and a drain voltage $v_d$;
      a second photodiode coupled between ground and the internal node;
      an integrating capacitor coupled between the internal node and ground;

a first transistor having a gate coupled to the internal node;

a light-emitting output device coupled between a drain of the first transistor and the drain voltage $v_d$;

a second transistor having a gate coupled to a source of the first transistor and having a source coupled to ground;

a first resistor coupled between the internal node and a drain of the first transistor; and a second resistor coupled between the gate of the second transistor and ground.

6. The neuromorphic computing system of claim 5, wherein each optical interconnection network in the set of intervening optical interconnection networks comprises a network of 2×2 Mach-Zehnder interferometer blocks connected in a mesh.

7. The neuromorphic computing system of claim 5, wherein:

the first photodiode converts an optical excitatory input signal into a corresponding electrical excitatory input signal;

the second photodiode converts an optical inhibitory input signal into a corresponding electrical inhibitory input signal;

each photonic neuron further comprises an electrical neuron that receives the electrical excitatory and inhibitory input signals, and generates an electrical output signal that includes periodic voltage spikes that are triggered by integration of the electrical excitatory and inhibitory input signals; and the light-emitting output device converts the electrical output signal into a corresponding optical output signal.

8. The neuromorphic computing system of claim 7, wherein the electrical neuron implements an integrate-and-fire model, wherein the electrical excitatory and inhibitory input signals are integrated until a firing threshold is reached, which causes the electrical neuron to fire and generate a voltage spike on the electrical output signal.

9. The neuromorphic computing system of claim 7, wherein the electrical neuron implements a sigmoid-shaped nonlinear activation function.

10. The neuromorphic computing system of claim 7, wherein the light-emitting output device comprises a light-emitting diode (LED) or a laser.

11. The neuromorphic computing system of claim 7, wherein the electrical excitatory input signal comprises a weighted sum of one or more excitatory input signals; and wherein the electrical inhibitory input signal comprises a weighted sum of one or more inhibitory input signals.

12. A three-dimensional (3D) integrated neuromorphic computing system, comprising:

a stack containing computational planes, wherein each computational plane in the stack includes a nanophotonic neural network;

wherein the stack additionally includes at least one memory plane containing nanophotonic memory elements; and wherein successive planes in the stack are coupled together through a set of vertical optical vias, each of which comprises:

a bottom waveguide configured to convey light in a horizontal direction;

an inverted 45-degree reflector configured to reflect horizontally propagating light from the bottom waveguide in a vertical direction;

a vertical silicon escalator configured to convey light in a vertical direction from the inverted 45-degree reflector;

a 45-degree reflector configured to reflect vertically propagating light from the vertical silicon escalator in a horizontal direction; and a top waveguide configured to convey light received from the 45-degree reflector in a horizontal direction.

13. The 3D integrated neuromorphic computing system of claim 12, wherein each nanophotonic neural network in each computational plane comprises:

a sequence of neural layers, wherein each neural layer comprises a set of photonic neurons, wherein each photonic neuron converts one or more optical input signals into corresponding electrical input signals, processes the electrical input signal to produce an electrical output signal, and converts the electrical output signal into an optical output signal; and a set of intervening optical interconnection networks, which couple together successive neural layers in the sequence of neural layers, wherein each interconnection network provides weighted links between photonic neurons in successive neural layers.

14. The 3D integrated neuromorphic computing system of claim 13, wherein each optical interconnection network in the set of intervening optical interconnection networks comprises a network of 2×2 Mach-Zehnder interferometer blocks connected in a mesh.

15. The 3D integrated neuromorphic computing system of claim 13, wherein each photonic neuron in each neural layer comprises:

an excitatory-input photo detector that converts an optical excitatory input signal into a corresponding electrical excitatory input signal;

an inhibitory-input photo detector that converts an optical inhibitory input signal into a corresponding electrical inhibitory input signal;

an electrical neuron that receives the electrical excitatory and inhibitory input signals, and generates an electrical output signal, which includes periodic voltage spikes that are triggered by integration of the electrical excitatory and inhibitory input signals; and a light-emitting output device, which converts the electrical output signal into a corresponding optical output signal.

16. The 3D integrated neuromorphic computing system of claim 15, wherein the electrical neuron implements an integrate-and-fire model, wherein the electrical excitatory and inhibitory input signals are integrated until a firing threshold is reached, which causes the electrical neuron to fire and generate a voltage spike on the electrical output signal.

17. The 3D integrated neuromorphic computing system of claim 15, wherein the electrical neuron implements a sigmoid-shaped nonlinear activation function.

* * * * *

UNITED STATES PATENT AND TRADEMARK OFFICE
CERTIFICATE OF CORRECTION

| | |
|---|---|
| PATENT NO. | : 11,144,821 B2 |
| APPLICATION NO. | : 16/115353 |
| DATED | : October 12, 2021 |
| INVENTOR(S) | : Yoo et al. |

It is certified that error appears in the above-identified patent and that said Letters Patent is hereby corrected as shown below:

On the Title Page

Item (73) please add the Assignee --The Board of Trustees of the Leland Stanford Junior University, Stanford, CA (US)--

Signed and Sealed this
Ninth Day of August, 2022

Katherine Kelly Vidal
*Director of the United States Patent and Trademark Office*